Aug. 4, 1942.   A. E. BAAK   2,291,783
HYDRAULIC VALVE
Filed March 11, 1939

Inventor
Albert E. Baak
By George H Fisher
Attorney

Patented Aug. 4, 1942

2,291,783

UNITED STATES PATENT OFFICE 2,291,783

HYDRAULIC VALVE

Albert E. Baak, Minneapolis, Minn., assignor to Minneapolis-Honeywell Regulator Company, Minneapolis, Minn., a corporation of Delaware Application March 11, 1939, Serial No. 261,229

6 Claims. (Cl. 103—41)

My invention relates to improvements in hydraulic transmission mechanisms, particularly when used as means for actuating valves and the like.

The principal object of my invention is to provide a hydraulic transmission mechanism for actuating a valve or the like wherein positive acting release means are provided for insuring return movement or retraction of the valve or similar device after it has been moved under the influence of pressure of hydraulic medium. The attainment of this object is particularly advantageous in valve actuators controlling gas valves and the like where there must be assurance that the valve is closed automatically in response to control equipment. In the past electric valves have been commonly used. These valves being of the solenoid type, have a serious and aggravating tendency to stick in the open position creating a hazardous condition.

Another object of my invention is the provision of a pressure operated device having a positive, mechanically actuated pressure release means for releasing pressure to actuate the device.

Another object of my invention is the provision of a hydraulically operated valve device employing an electrically driven fluid forcing means comprising an armature mounted on a shaft arranged to simultaneously actuate a pressure release valve when the motor is energized.

Figure 1:
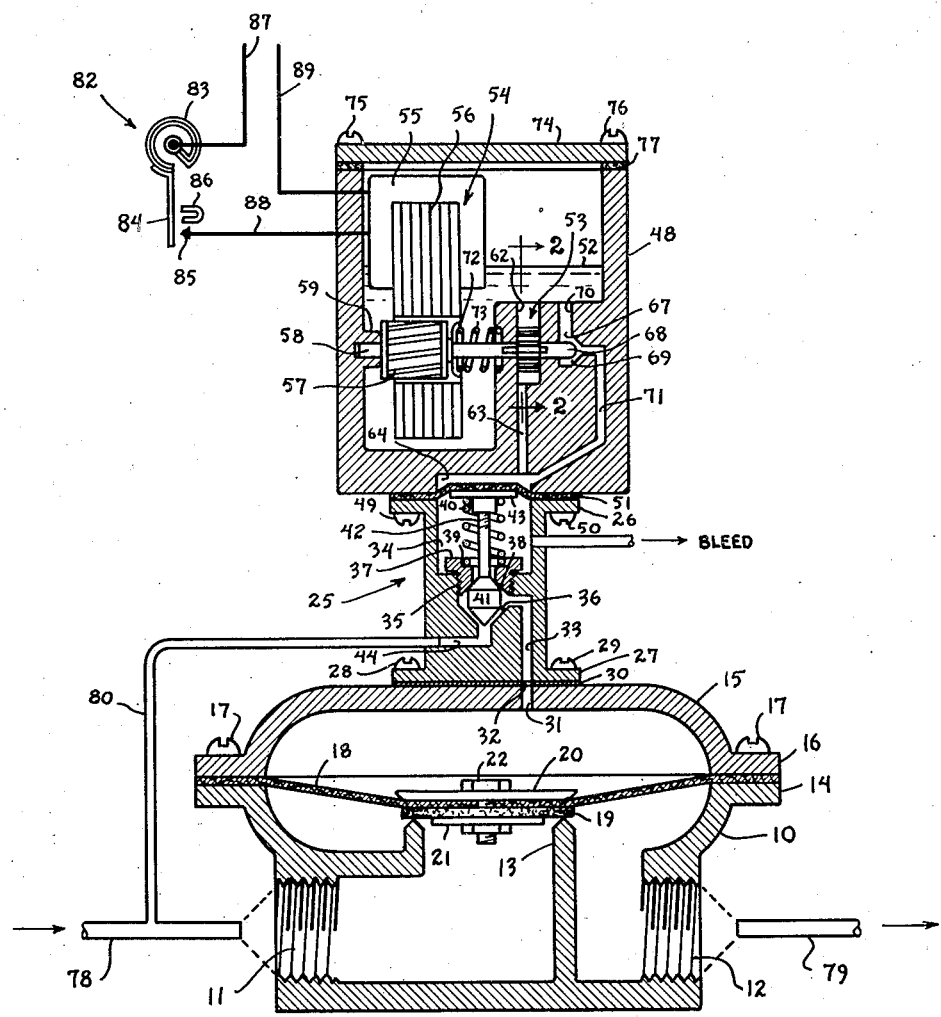
Figure 1 is a sectional view of a preferred embodiment of my invention.

Referring to Figure 1 of the drawing, numeral 10 designates the body of a valve which in the present instance is a diaphragm type gas valve. The inlet of the valve is at 11 and the outlet at 12, the valve body being internally configurated so as to form a seat 13. The upper part of the valve body is of circular conformation having a flange 14. Numeral 15 designates a cover for the valve having a flange 16 corresponding to the flange 14. Flanges 14 and 16 are securely fastened together by screws 17, the peripheral portions of a flexible diaphragm 18 being interposed between the flanges in sealing relation therewith. Adjacent the central portion of the diaphragm 18 is a flexible valve seat disc 19 and on the opposite side of the diaphragm is a metal backing disc 20. A washer 21 is disposed on that side of the valve disc 19 away from the diaphragm, and the discs and diaphragm are secured together by means of a bolt 22. The diaphragm 18 and seat disc 19 may be made of a suitable flexible material such as leather. The seat disc 19 is adapted to seat upon the seat 13 and to thereby prevent flow of fluid through the valve. The structure so far described comprises a diaphragm type gas valve of conventional construction.

Numeral 25 designates a three-way pilot valve which may be of generally cylindrical shape having flanges 26 and 27 at its opposite ends. The lower flange 27 is secured to the cover 15 of the diaphragm valve by means of screws 28 and 29, there being a gasket 30 of suitable sealing material interposed between the flange 27 and the cover 15. There is an opening 31 in the cover 15 of the diaphragm valve coaxial with an opening 32 in the gasket 30 and with a channel 33 in the body of the three-way valve 25.

The upper part of the body of the three-way valve 25 has an opening or bore 34 and a smaller bore 35 the lower part of which forms a valve seat 36. The bore 35 is screw threaded and screwed into this bore is a flanged nut 37. The lower part of the nut 37 forms a valve seat 38 similar to the valve seat 36 and the upper part of the nut 37 is recessed at 39 so as to form an annular shoulder for purposes of retaining a coil spring 40. Disposed between the valve seats 36 and 38 is a valve member 41 so formed as to seat upon the valve seat 36 when moved downwardly and to seat upon the valve seat 38 when moved upwardly. A stem 42 is connected to the valve member 41. The stem extends through nut 37 and at the upper end is a collar disc 43. The upper end of the coil spring 40 bears against the collar disc 43 so that the valve member 41 is normally urged against the upper seat 38. The channel 33 in the body of the three-way valve communicates laterally with the space between the valve seats 36 and 38 and a channel 44 in the valve body communicates with the space between the valve seats through the valve formed in part by the seat 36.

The flange 26 is secured to the bottom of a casing 48 forming a liquid reservoir by means of screws 49 and 50 there being a flexible diaphragm 51 interposed between the flange 26 and the bottom of the casing 48. The collar disc 43 previously described bears upwardly against the central portion of the diaphragm 51. The space within the casing 48 is partially filled with a hydraulic fluid 52 which is preferably oil and this hydraulic liquid is adapted to be pumped by means of a gear pump indicated generally at 53 and mounted in a portion of the casing 48. The gear pump 53 is driven by an electric motor indicated generally at 54, the electric motor comprising a winding 55, a laminated core 56, and an armature 57.

Figure 2:
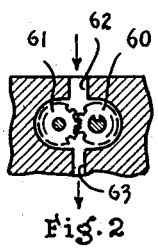
Figure 2 is a cross sectional detail view taken along the line 2—2 of Figure 1.

The winding 55 is wound around a portion of the core 56 in the usual manner and the core 56 and armature 57 form a more or less complete magnetic circuit for magnetic flux induced in the core by current in the winding. The armature 57 is mounted on a shaft or spindle 58 between portions of the core 56 constructed and arranged to form poles on opposite side of the armature in the usual manner. The shaft 58 of the motor is journalled in a boss 59 formed on an inner wall of the casing 48 and is also journalled in portions of the casing 48 which form a housing for the gear pump 53. One of the gears of the gear pump designated at 60 is splined onto the shaft 58 as may be seen on both Figure 1 and Figure 2 so that the gear 60 is constrained to rotate with the shaft 58. The gear 60 drives the other gear 61 of the gear pump (see Figure 2) which is suitably mounted on a counter shaft. The inlet to the gear pump is designated at 62 and communicates with the liquid reservoir formed within the casing 48. A channel 63 formed in a portion of the casing 48 communicates with the discharge of the gear pump and with a recessed portion 64 formed at the central portion of the bottom of the casing 48. The armature 57 of the motor 54 is secured to the shaft 58 so that the motor can drive the gear pump so as to pump oil from within the casing 48 through the channel 63 into the recess 64. The diaphragm 51 is adjacent the recess 64 so that a liquid chamber is formed within the recess 64 and when hydraulic liquid, that is, the oil, is pumped into this chamber its pressure acting on the diaphragm 51 is sufficient to force the valve stem 42 downwardly against the force of coil spring 40.

The right end of the shaft 58 extends beyond the gear pump 53 into an opening 67 in a portion of the casing 48 and this end of the shaft forms a valve head 68. The valve head 68 cooperates with a valve seat 69 formed by the opening 67 within casing 48. The opening 67 communicates with the oil reservoir by a channel 70 and with recess 64 by means of a channel 71. The shaft 58 may be longitudinally reciprocated so that the valve 68 is moved against and away from the seat 69.

Disposed on the shaft 58 adjacent to the armature 57 is a spring retaining disc 72. Encircling the shaft 58 is a coil spring 73, one end of which bears against the disc 72 and the other end of which engages in a suitable recess formed in a portion of the casing 48. The coil spring 73 continuously urges the armature 57 and shaft 58 to the left in a direction to move valve 68 away from seat 69. With the parts in the positions shown the motor 54 is not energized and the force of coil spring 73 keeps the armature 57 in a position with its magnetic center displaced to the left of the normal path of magnetic flux between the poles formed by the core 56. When the motor 54 is energized, as well as rotating the armature 57, it is moved to the right in the manner of a solenoid so that its magnetic center is brought to a position wherein the path of magnetic flux between the poles of the core 56 will be shortest. Movement of armature 57 and shaft 58 to the right is permitted because the driving gear 60 of the gear pump is splined onto the shaft and when the shaft 58 is moved to the right in the manner described valve 68 seats on valve seat 69 cutting off communication between the chamber formed by the recess 64 and the oil reservoir within casing 48 through the channels 71 and 70. The valve 68 forms a release valve for releasing pressure from within the chamber formed by the recess 64 and permitting it to flow back into the reservoir within the casing 48. Thus when the gear pump 53 is started to pump oil into the chamber formed by the recess 64 the release valve 68 is automatically closed and when the motor 54 is stopped the armature 57 and shaft 58 will move into the position shown so as to open valve 68 and quickly release the pressure from above the diaphragm 51.

The upper part of the casing 48 is closed by means of a cover 74 secured to the casing by screws 75 and 76 there being a sealing gasket 77 interposed between the cover and the upper part of the casing 48.

The diaphragm valve which I have shown in Figure 1 is particularly adapted to control the flow of gas in a gas fired heating system. Numeral 78 shows diagrammatically a gas main which may be connected to the inlet 11 of the diaphragm valve and the outlet of the valve may be connected to a conventional gas burner by means of a conduit 79. The channel 44 in the body of the three-way valve communicates with the gas supply by means of a tube 80 and a bleed tube 81 is connected to the opening or bore 34 in the upper part of the body of the three-way valve so as to bleed gas therefrom.

The temperature of the objective being heated such as a space in a building for example is controlled by means of a thermostat 82 which may be of conventional type comprising a bimetal element 83 arranged to actuate a switch blade 84 cooperating with an electrical contact 85. Adjacent the blade 84 is a permanent magnet 86 so arranged that the blade 84 moves against and away from the contact 85 with a snap action.

In operation of the device and the system in which it is used, whenever the temperature of the space being heated falls to a predetermined value, blade 84 of the thermostat engages contact 85 completing a circuit energizing the winding 55 as follows: from wire 87 to the thermostatic element 83, blade 84, contact 85, wire 88, and winding 55 back to the wire 89. The wires 87 and 89 may of course be connected to any suitable source of power. When winding 55 is energized armature 58 rotates so as to drive the gear pump and as above described the shaft 58 is moved to the right so as to seat valve head 68 on the seat 69 closing off communication between the channels 71 and 70. As the gear pump operates, oil is withdrawn from within the reservoir in casing 48 and forced into the chamber above the diaphragm 51. As the pressure above diaphragm 51 builds up, the valve stem 42 and valve member 41 are forced downwardly from the position shown until valve member 41 engages the seat 36. When valve member 41 engages seat 36, the supply of gas to the space above diaphragm 18 through tube 80 is cut off and the gas above diaphragm 18 is released through the channel 33 to the bore or opening 34 within the body of valve 25 from which it is bled off to an auxiliary pilot burner through the bleed tube 81. When the pressure above diaphragm 18 is released the pressure from gas main 78 acting on seat disc 19 will break the seal between disc 19 and the seat 13. When this happens the lower side of diaphragm 18 will suddenly become exposed to gas pressure leaking through the valve and the diaphragm will be snapped upwardly to the open position of the diaphragm valve. Gas will now be supplied to the burner and heating will continue as long as the thermostat remains on, with the gear pump operating and pressure acting on the diaphragm 51. Whenever the thermostat becomes satisfied, deenergizing the motor 54, the armature 57 and shaft 58 will take the position shown in Figure 1 with valve head 68 away from seat 69. In this manner the pressure above diaphragm 51 will quickly be released, the oil from above the diaphragm passing back into the reservoir through the channels 71 and 70. The coil spring 40 will quickly move valve member 41 into the position shown in Figure 1 and pressure from the gas main 78 will be communicated to the space above diaphragm 18 through the tube 80, channel 44, channel 33, and opening 31. The pressure above the diaphragm 18 will snap it downwardly into closed position of the valve in the conventional manner of operation of diaphragm valves.

From the foregoing it is apparent that I have provided a novel and meritorious arrangement for controlling the actuation of valves or similar devices. While I have shown a preferred form of my invention wherein a diaphragm gas valve is hydraulically controlled my arrangement might also be used to control other devices adapted to be hydraulically actuated. My invention is however particularly adapted to the actuation of pilot valves which control diaphragm gas valves or the like. With my arrangement the danger of the pilot valve sticking in an open position so as to keep the diaphragm valve open at a time when it should be closed, is entirely obviated. When the pilot valve of my arrangement is to move into a position to cause closure of the diaphragm valve the valve for releasing pressure from above the diaphragm 51 is positively actuated so that there is no way that the pilot valve could fail to return it to the position shown in Figure 1. Thus the dangers attendant to electric valves sticking in open position or pressure operated release valves failing to operate in the intended manner are avoided, my arrangement providing a reliable and economical construction capable of supplanting the aforementioned devices but without possessing their inherent disadvanatges. The gear pump and the driving motor for it may be made very small and compact but yet being able to control a relatively large diaphragm valve by means of the pilot valve.

The single embodiment of my invention which I have disclosed in detail is a preferred form and application of it but there are various forms which it may take and uses to which it may be put which are intended to fall within the spirit and scope of the invention. The invention is therefore to be limited only by the appended claims.

I claim as my invention:

1. Fluid pressure control means comprising in combination, a pump for supplying fluid under pressure, a valve for relieving pressure supplied by said pump, and motor means for operating said pump and said valve comprising an electrical winding and a rotor mounted so as to be translated upon energization of said winding, rotation of said rotor serving to actuate said pump, and translation of said rotor serving to move said valve to closed position.

2. Fluid pressure control means comprising in combination, a rotary pump for supplying fluid under pressure, a shaft for rotating said pump, a splined connection between said pump and said shaft to permit longitudinal movement of said shaft, a valve for relieving pressure supplied by said pump, a connection between said shaft and said valve, and motor means for simultaneously rotating said shaft to operate said pump and moving said shaft longitudinally to close said valve.

3. Fluid pressure control means comprising in combination, a rotary pump for supplying fluid under pressure, a shaft for rotating said pump, a splined connection between said pump and said shaft to permit longitudinal movement of said shaft, a valve for controlling pressure supplied by said pump, a connection between said shaft and said valve, and motor means for operating said pump and valve comprising an electrical winding and an armature associated with said shaft, energization of said winding causing rotation of said shaft to operate said pump and translation of said shaft to operate said valve.

4. Fluid pressure control means comprising in combination, a pump for supplying fluid under pressure, a shaft for driving said pump, a connection between said shaft and said pump to permit longitudinal movement of said shaft, a valve member carried by one end of said shaft for controlling pressure supplied by said pump, and motor means for operating said pump and valve comprising an electrical winding and an armature associated with said shaft, energization of said winding causing rotation of said shaft to operate said pump and translation of said shaft to operate said valve.

5. Fluid pressure control means comprising in combination, a pump for supplying fluid under pressure, a valve for relieving pressure supplied by said pump, and motor means comprising a single electrical winding and a unitary structure actuated thereby upon energization thereof for operating said pump and simultaneously closing said valve.

6. Fluid pressure control means comprising in combination, a pump for supplying fluid under pressure, a valve for controlling pressure supplied by said pump, an integral structure for operating said pump and said valve, and electrical winding means for actuating said structure upon energization of said winding means.

ALBERT E. BAAK.